UNITED STATES PATENT OFFICE.

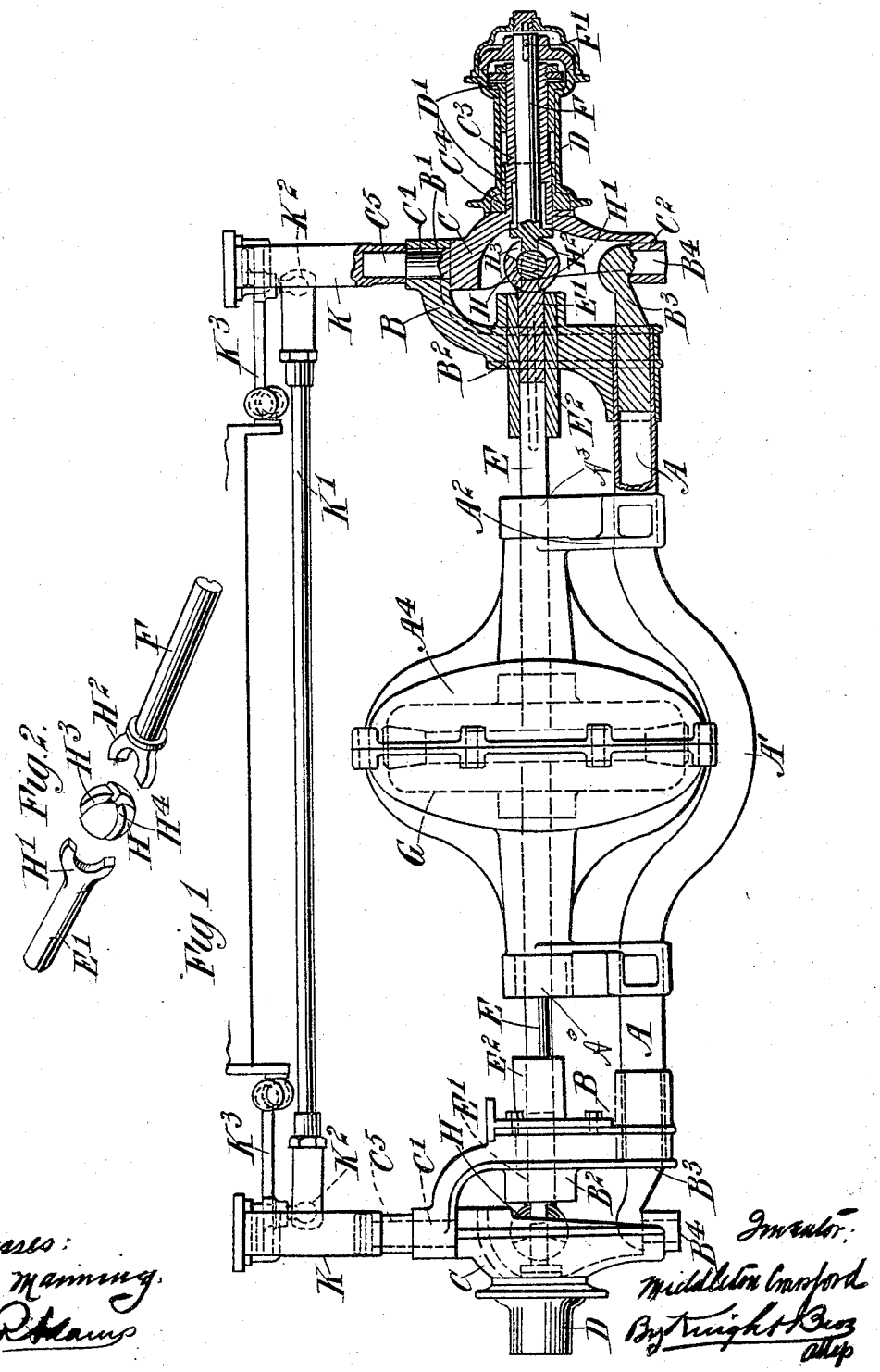

MIDDLETON CRAWFORD, OF LONDON, ENGLAND.

SELF-PROPELLED VEHICLE.

SPECIFICATION forming part of Letters Patent No. 725,222, dated April 14, 1903.

Application filed December 12, 1902. Serial No. 134,963. (No model.)

*To all whom it may concern:*

Be it known that I, MIDDLETON CRAWFORD, a subject of the King of England, residing at London, England, have invented certain new and useful Improvements in or Relating to Self-Propelled Vehicles, of which the following is a specification.

This invention relates to improvements in the construction of self-propelled vehicles in which either the front or rear axle, or both, is used for driving purposes, while the wheels mounted thereon are employed for steering.

In carrying out my invention I provide a cross-bar, which may be called a "stationary" axle, ending at each extremity in a vertical jaw-piece or yoke. The upper end of the yoke is provided with a hole, while the lower end of the yoke has a dependent pin, a bearing for the running-axle being formed midway between the hole and the pin. Corresponding jaw-pieces or yoke-pieces are provided which carry the bearings for the wheel-hubs and the ends of the running-axle, which are made separate from the rest of the axle, as hereinafter described. Each yoke-piece has a pin adapted to be pivotally engaged in the hole of the yoke and a hole to pivotally engage the dependent pin of the same. The yoke-piece pin extends beyond the yoke-hole and has secured to it an upward extension, the extensions belonging to the different wheel yoke-pieces being connected together and operated by a convenient form of steering mechanism. The running-axle is formed in four pieces. The two central pieces, supported in the bearings before described in the yokes and in upward extensions from the stationary axle or cross-bar, are connected centrally by a balance-gear and rotated from a motor in a convenient manner, preferably by the balance mechanism gearing with a motor-shaft running longitudinally on the vehicle. The outer end of each central portion of the axle ends in one portion of a universal joint, the other portion of which is formed on the detached end of the axle before referred to and to which the wheel is attached, this joint being placed within the bend of the yoke. I employ a special form of joint consisting of a sphere with two circumferential grooves in planes perpendicular to each other, into which grooves fit flattened forks or jaws formed on the axle end. Preferably both the running and the stationary axle are made of tubes with solid ends, and a convenient construction is to form the dependent pin of the yoke before described to fit within the corresponding hollow end of the stationary axle, while one portion of the universal joint forms the corresponding solid end of the running-axle. To economize space and allow room for the balance-gear without widely separating the axles, the stationary axle is preferably provided with a central dependent bend. Members to support the springs which carry the body of the vehicle are preferably formed with or rigidly secured to the yokes.

A convenient form of construction of my invention is shown in the accompanying drawings, of which—

Figure 1 is an elevation, partly in section, of an axle and its supporting-bar; and Fig. 2 is a perspective view of the three members constituting the universal joint detached.

Like letters of reference indicate like parts in both figures.

A is the stationary axle, with a central dependent bend A', on each side of which is an upward extension $A^2$. These extensions each have a bearing $A^3$ for the running-axle and support a casing $A^4$ for the balance-gear. At each end of the stationary axle is a vertical yoke B, having a hole B' and a bearing $B^2$. A short rod $B^3$ is fixed in the end of the hollow axle A, having a dependent pin $B^4$.

C is a yoke-piece having a round pin C' engaged and forming a working fit in the hole B' of the yoke and with a hole $C^2$, within which the pin $B^4$ is engaged, forming a working fit. The yoke-piece has a central hollow extension $C^3$, carrying on its outside bearings D' for the hub D of the carriage-wheel and a second internal bearing $C^4$ for the axle end.

Each half of the running-axle is formed of two pieces—a central portion E and an end piece F. The central portion E of each half is carried in the bearings $A^3$, and they are connected together by the balance-gear G. The outer end of each central portion ends in a flat fork, which forms one member of a universal joint connecting the central and end portions of the axle. Preferably, as shown in the figures, this fork H' is formed on a short pin E', fixed in one end of the sleeve E². The sleeve is revolubly carried in the yoke-bearing B² and its other end is fixed onto the axle portion E. The end portion F of the axle carried in the bearing C⁴ of the yoke-piece extension has on one end a fork H², similar to the fork H' of the central portion E, while its outer end is secured in a known manner—say by pin F'—to the wheel-hub D. Each fork H' H² is engaged within a circumferential slot H³ H⁴, respectively, formed at a right angle to each other on a sphere H, which constitutes the central member of the universal joint.

The pin C' of the yoke-piece has a rectangular extension C⁵, which is engaged in a rotatable sleeve K. The sleeves of the two halves of the axle are connected together by a rod K', ball-and-socket joints K², and bell-crank levers K³, and these may be operated in a known manner for steering purposes.

What I claim as my invention, and desire to secure by Letters Patent, is—

In a self-propelled vehicle, the combination with a running-shaft divided into two portions, a universal joint connecting the two portions of said shaft, and a pivoted hub-yoke in which one portion of the running-shaft turns, of a stationary hollow shaft, a vertical yoke secured to and extending upwardly from the hollow shaft, having a bearing for the other portion of the running-shaft and a pivotal connection with the hub-yoke, and a rod fitted at one end into the hollow shaft, and having a pivotal connection with the hub-yoke.

In testimony whereof I have signed my name to this specification in the presence of two subscribing witnesses.

MIDDLETON CRAWFORD.

Witnesses:
HARRY W. WIDGE,
WM. J. DOW.